United States Patent
Schuessler et al.

(10) Patent No.: US 6,969,493 B2
(45) Date of Patent: Nov. 29, 2005

(54) APPARATUS FOR PRODUCING A HYDROGEN-RICH AND LOW CARBON MONOXIDE GAS

(75) Inventors: Martin Schuessler, Ulm (DE); Barbara Strobel, Dornstadt (DE); Detlef zur Megede, Bubesheim (DE)

(73) Assignee: Ballard Power Systems AG, Kirchheim/ Teck-Nabern (DE)

( * ) Notice: Subject to any disclaimer, the term of this patent is extended or adjusted under 35 U.S.C. 154(b) by 628 days.

(21) Appl. No.: 09/781,674

(22) Filed: Feb. 21, 2001

(65) Prior Publication Data

US 2001/0005500 A1    Jun. 28, 2001

Related U.S. Application Data

(62) Division of application No. 09/106,220, filed on Jun. 29, 1998, now Pat. No. 6,241,792.

(30) Foreign Application Priority Data

Jun. 28, 1997  (DE)  ................................ 197 27 588

(51) Int. Cl.$^7$ ........................ B01D 50/00; B01D 53/34
(52) U.S. Cl. ........................ 422/177; 422/187; 422/188
(58) Field of Search ............................... 422/177, 187, 422/188, 189; 423/246, 248, 210

(56) References Cited

U.S. PATENT DOCUMENTS

| | | | | |
|---|---|---|---|---|
| 1,935,675 A | * | 11/1933 | Spalding | ..................... 423/655 |
| 3,407,146 A | * | 10/1968 | Becker et al. | ............... 252/377 |
| 3,631,073 A | * | 12/1971 | Cohn et al. | .................. 252/376 |
| 3,656,905 A | * | 4/1972 | Smith et al. | ................. 423/653 |
| 5,093,102 A | * | 3/1992 | Durand et al. | ............ 423/648.1 |
| 5,152,976 A | * | 10/1992 | Fong et al. | .................. 423/652 |
| 5,366,708 A | * | 11/1994 | Matros et al. | ............... 423/210 |
| 5,714,132 A | * | 2/1998 | Kapoor et al. | ........... 423/418.2 |
| 5,753,194 A | * | 5/1998 | Heil et al. | ................... 422/190 |

FOREIGN PATENT DOCUMENTS

| | | | |
|---|---|---|---|
| DE | 44 23 587 C2 | 1/1996 | |
| DE | 4423587 C2 | * 9/1996 | ............ C01B 3/02 |
| DE | 195 44 895 C1 | 2/1997 | |

OTHER PUBLICATIONS

Patent Abstracts of Japan, C-186, Sep. 14, 1983, vol. 7/No. 209, JP 58-108291 (A), Jun. 28, 1983, Ikuo Matsumoto.
Patent Abstracts of Japan, JP 08119602 A, Oct. 28, 1994, Tanizaki Katsuji et al.

* cited by examiner

Primary Examiner—M. Alexandra Elve
(74) Attorney, Agent, or Firm—Crowell & Moring LLP

(57) ABSTRACT

A process for generating a high-hydrogen, low-carbon monoxide gas comprises generating a product gas in a gas generating device. The product gas contains hydrogen and carbon monoxide that are generated from catalytic water vapor reforming of a water/fuel mixture and/or from partial oxidation of an oxygen/fuel mixture. In a gas purification stage, the carbon monoxide fraction in the product gas is reduced by selective CO oxidation on an oxidation catalyst. During a starting phase, oxygen is admixed to the supplied fuel and the flow direction is reversed such that the flow first takes place through the gas purification stage and only then through the gas generating device.

6 Claims, 2 Drawing Sheets

APPARATUS FOR PRODUCING A HYDROGEN-RICH AND LOW CARBON MONOXIDE GAS

This application is a division of application Ser. No. 09/106,220, filed Jun. 29, 1998 now U.S. Pat. No. 6,241,792.

BACKGROUND AND SUMMARY OF THE INVENTION

This application claims the priority of German Patent Application No. 197 27 588.5, filed on Jun. 28, 1997, the disclosure of which is expressly incorporated by reference herein.

The present invention relates to a process and a system for generating a high-hydrogen, low-carbon monoxide gas.

A system for generating hydrogen by means of partial oxidation and/or the water vapor reforming of methanol is known from German Patent Document DE 44 23 587 C2. In addition to containing hydrogen, the reforming product gas flow also contains carbon monoxide which is undesirable for certain applications, for example, during the conversion of the generated hydrogen in a fuel cell.

For eliminating or at least reducing the carbon monoxide fraction in the high-hydrogen gas, it is also known to connect a gas purification stage behind the gas generating device. Such a gas purification stage is known, for example, from German Patent Document DE 195 44 895 C1, in which the carbon monoxide contained in the high-hydrogen gas is selectively oxidized with the addition of oxygen on an oxidation catalyst.

During starting, the gas generating system must be brought to the operating temperature. This can take place, for example, by heating from the outside or by introducing hot gases. From Japanese Patent Document JP 58-108291 A, it is known, for example, to provide a ceramic core with an electric heating device in a reformer. For generating hot gases, for example, a catalytic combustion on a Pt-containing catalyst can be used. From Japanese Patent Document JP 08119602 A, a gas generating system is known, for example, which has a separate catalytic burner. A hot gas is generated there whose energy is transmitted in an evaporator to the gas to be reformed and thus, during the flow through the reformer, is also transmitted to the reformer. A disadvantage of these systems is the fact that additional components are required for the heating, particularly in the starting phase.

It is an object of the present invention to provide a process and apparatus for generating a high-hydrogen, low-carbon monoxide gas with improved cold-starting characteristics.

This problem is solved by a process and a system according to the present invention.

During the normal operation of a gas generating system, the gas flows through a gas purification stage only after it has flowed through the gas generating device. If a system for the selective CO-oxidation is used as the gas purification stage, which generally contains a platinum-containing catalyst for removing the carbon monoxide from the high-hydrogen gas, the system can temporarily be operated as a catalytic burner during the starting phase in a simple manner by a reversal of the flow direction so that the gas generating system can easily and rapidly be brought to the necessary operating temperature. Additional components, apart from corresponding switching valves, are not required for this purpose. Thus, a compact system is created.

If this flow reversal principle is used in a gas generating device in which, in addition to or instead of the water vapor reforming, partial oxidation is also carried out, another advantage results. A platinum-containing zone which in the normal operation is disposed in front of the reforming area would necessarily lead to a two-stage method of operation. In the normal operation, the oxygen in the gas flow would be completely consumed in the platinum-containing zone, which is highly active for the combustion. As a result, large amounts of heat are released in the platinum-containing zone which must be transported into the reforming area. Should this two-stage operating method not be desired, the flow through the platinum-containing zone is permitted only during the starting phase, which would result in an exclusive use of this component for the starting phase.

In contrast, by means of the system and process according to the present invention, a simple solution is obtained without a separate reactor or reactor area which is used only during the starting phase.

Other objects, advantages and novel features of the present invention will become apparent from the following detailed description of the invention when considered in conjunction with the accompanying drawings.

DETAILED DESCRIPTION OF THE DRAWINGS

Figure 1:
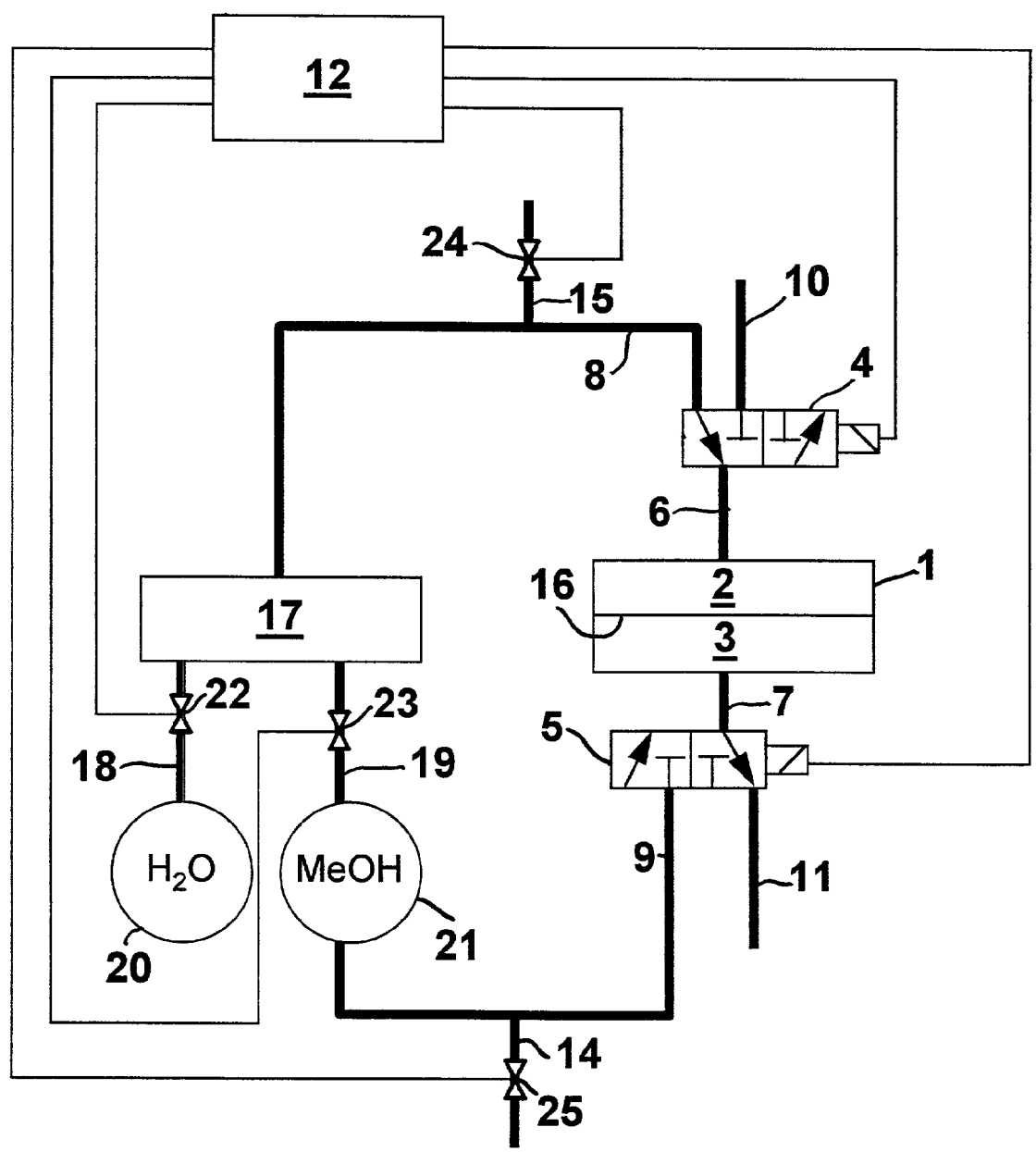
FIG. 1 is a basic diagram of a system for generating a high-hydrogen, low-carbon monoxide gas with the valve shifting positions during normal operation.

The system for generating a high-hydrogen, low-carbon monoxide gas indicated as a whole by reference number 1 in FIG. 1 and in the following called gas generating system, consists of a gas generating device 2 and of a gas purification stage 3. The gas generating device 2 may be constructed as a reactor for the catalytic water vapor reforming of a water vapor/fuel mixture (i.e, "reformer"), or as a reactor for the partial oxidation of an oxygen/fuel mixture. In addition, it is also possible to integrate the reactor for the partial oxidation in the reformer in that a suitable oxidation catalyst is preferably arranged in the inlet area of the reformer.

The gas purification stage 3 is constructed as the device for the selective carbon monoxide oxidation (i.e., "CO-oxidator"). In normal operation, the product gas is guided from the gas generating device 2 directly into the gas purification stage 3. The gas generating system 1 is preferably constructed as a heat exchanger, a heat exchanger surface 16 being provided between the gas generating device 2 and the gas purification stage 3. Any hydrocarbon-containing starting substances can be used as fuel, the following embodiment being explained by means of methanol as the fuel.

A gaseous water vapor/methanol mixture is supplied to the gas generating device 2 by way of a feed pipe 6. For generating the water vapor/methanol mixture, an evaporator 17 is provided to which water and liquid methanol is supplied from corresponding storage tanks 20, 21 by means of delivery pumps, which are not shown, by way of corresponding pipes 18, 19. For the metering of the media, or for the activating/deactivating of the delivery, metering valves 22, 23 are provided in the pipes 18, 19. The water vapor/methanol mixture generated in the evaporator 17 is then, in the normal operation, by way of the pipe 8 and the two-way valve 4 fed into the pipe 6. In this switching condition of the two-way valve 4, the connection between the pipe 6 and a pipe 10 is interrupted. If an oxidation catalyst is provided in the gas generating device 2, a suitable amount of oxygen or air is metered to the water vapor/methanol mixture by way of an oxygen supply pipe 15 with an integrated metering valve 24.

During the catalytic water vapor reforming of methanol, while heat is supplied, a mixture of methanol and water vapor is converted to hydrogen on a suitable catalyst; carbon dioxide and carbon monoxide are generated simultaneously:

$$CH_3OH + H_2 \rightarrow 3H_2 + CO_2 \text{ or } CH_3OH \rightarrow 2H_2 + CO$$

As an alternative, or in addition, methanol may also be converted while adding oxygen by a partial oxidation to carbon dioxide and hydrogen:

$$CH_3OH + \tfrac{1}{2}O_2 \rightarrow 2H_2 + CO_2$$

The CO oxidator 3 is used for removing CO, by means of a selective oxidation of carbon monoxide, from the high-hydrogen gas generated in the gas generating device 2. The product gas consisting, for example, of hydrogen and carbon dioxide with a CO fraction of 1–3% by volume, after a corresponding purification, is preferably used for the mobile application of PEM fuel cells in vehicles.

In the case of the partial or selective oxidation, oxygen is also added to the product gas, for example, in the form of ambient air, in which case the carbon monoxide CO is then oxidized by the oxygen $O_2$ to carbon dioxide $CO_2$:

$$CO + \tfrac{1}{2}O_2 \rightarrow CO_2$$

As an alternative, the oxygen can also be charged at one or several points directly into the CO oxidator 3, for example, by way of an additional pipe which, however, is not shown in the embodiment. The reaction is carried out on a suitable oxidation catalyst, such as platinum and/or ruthenium, on a suitable carrier, such as $Al_2O_3$ or a zeolite in powder form. After the purification of the product gas, the high-hydrogen, low-carbon-monoxide gas is then removed by way of the pipe 7, the two-way valve 5 and the pipe 11 to a receiver which is not shown, such as a storage device or a fuel cell.

Furthermore, the storage tank 21 for the methanol is connected by way of another pipe 9 with the two-way valve 5. However, in the normal operation, this pipe 9 is blocked by the two-way valve 5. In addition, a second oxygen feed pipe 14 with an integrated metering valve 25 is provided on the pipe 9. Finally, for controlling the whole system, a control apparatus 12 is provided which is connected with the valves 4, 5, 22–25 by way of control lines.

During the normal operation, the two-way valves 4, 5 are held in the illustrated position of FIG. 1 by means of the control apparatus 12. The metering valve 25 is closed. The positions of the metering valves 22 to 24 are adjusted corresponding to a load demand.

The water vapor reforming is an endothermal reaction. This means that energy must be continuously supplied to the reformer for maintaining the reaction. Since the CO oxidation is a highly exothermal reaction, the reformer 2 and the CO oxidator 3 are preferably integrated in a common housing so that the energy released in the CO oxidator can be transmitted to the reformer 2 by way of the heat exchange surface 16. Naturally, it is also possible to heat the reformer separately by a heat exchanger integrated in the reformer so that the integration in a common housing is unnecessary.

Figure 2:
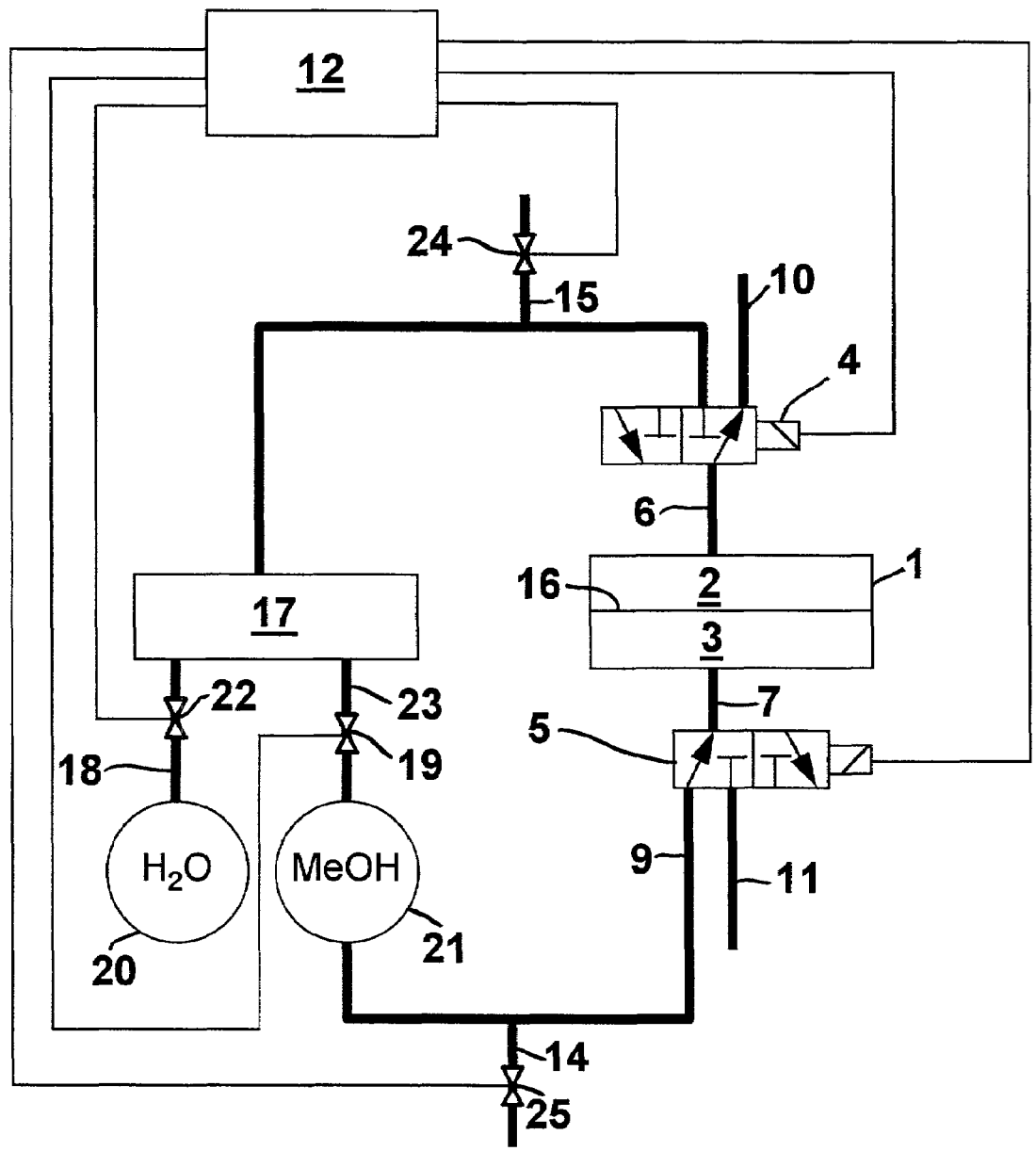
FIG. 2 is a view of the system of FIG. 1 with the valve shifting positions during a starting phase.

FIG. 2 illustrates the device explained in FIG. 1 in the switching position during the starting phase, in which case, with respect to FIG. 1, the same parts have identical reference numbers.

During the start, the control apparatus 12 brings the two-way valves 4, 5 into the illustrated switching positions. Simultaneously, the metering valves 22 to 24 are closed and the metering valve 25 is opened. As a result, no more water and methanol is supplied to the evaporator 17 or into the pipe 8. On the contrary, methanol and oxygen, which is supplied by way of line 14, are fed by way of the two-way valve 5 and the pipe 7 into the CO oxidator 3 and oxidized there on the CO oxidation catalyst. The CO oxidator with the oxidation catalyst contained therein is therefore temporarily used as a catalytic burner. By means of this catalytic oxidation, thermal energy is released. The hot gas will then flow through the gas generating device 2 which, as the result, is rapidly brought to the operating temperature. After flowing through the gas generating device 2, the gas is then by way of the pipe 6, the two-way valve 4 and the pipe 10 discharged into the environment or to a catalyst, which is not shown, for utilizing the residual gas. By means of the switching operations initiated by the control apparatus 12, the flow direction in the gas generating system is therefore reversed in the starting phase in comparison to the normal operation.

The starting phase is terminated, for example, after a defined time period or when a defined temperature in the system 1 is reached. The feeding of the fuel/oxygen mixture to the CO oxidator 3 will then be stopped by means of the control apparatus 12 by triggering the valves 4, 5, 22 to 25. Subsequently, the gas generating system 1 will then be operated in the above described manner.

In addition to the arrangement illustrated in the drawing, other embodiments are also conceivable. For example, the pipe 9 and the second oxygen supply pipe 14 can be eliminated. Instead, between the mouth of the oxygen supply pipe 15 and the two-way valve 4, a bypass pipe can branch off pipe 8 which is then, instead of pipe 9, connected with the two-way valve 5 for supplying a methanol/oxygen mixture during the starting phase. In this case, during the starting phase, water can then also be metered in from the storage tank 20.

Furthermore, the gas generating device 2 as well as the gas purification stage 3 can be constructed in several stages, in which case, in the starting phase, the flow can take place through one or several stages in the reversed flow direction. It is only important that the flow first takes place through the stages of the CO oxidator 3 and this stage will then be used as a catalytic burner. In the illustrated embodiment, in the starting phase, not only the sequence of the components 2, 3 is exchanged but the flow direction within the components 2, 3 is also reversed. However, it is also conceivable to exchange by means of a suitable guiding of the pipes the sequence of the components 2, 3 during the starting phase but to maintain the flow direction within the components 2, 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for generating a high-hydrogen, low-carbon-monoxide gas, comprising:
   a gas generating device for forming a product gas by at least one of catalytic water vapor reforming of a water vapor and fuel mixture and partial oxidation of an oxygen and fuel mixture;

a gas purification stage for removing carbon monoxide from the product gas by means of selective CO oxidation during a normal operation phase of said apparatus; and feed and discharge pipes operable during a starting phase of said apparatus for reversing a flow direction through said gas generating device and said gas purification stage by way of valves;

wherein, during said starting phase, said gas purification stage operates as a catalytic burner.

2. The apparatus according to claim 1, wherein during the starting phase, the gas generating device is arranged downstream of the gas purification stage and, after the conclusion of the starting phase, the gas purification stage is arranged downstream of the gas generating device.

3. The apparatus according to claim 1, further comprising an oxygen feed pipe for adding oxygen into a fuel feed pipe at least during the starting phase.

4. The apparatus according to claim 1, wherein the valves, are two-way valves, each connected with a fuel feeding pipe for feeding a fuel to one of said gas generating device and said gas purification stage, and each connected with a gas discharge pipe for discharging a gas from one of said gas generating device said gas purification stage.

5. The apparatus according to claim 4, further comprising a control apparatus for triggering the two-way valves such that, during a starting phase, said fuel feeding pipe to said gas purification stage and said gas discharging pipe from said gas generating stage are in a flow-type connection; and after conclusion of the starting phase, said fuel feeding pipe to said gas generating device and said gas discharging pipe from said gas purification stage are in a flow-type connection.

6. Gas generating apparatus, comprising:

a first catalytic reaction stage for forming a product gas by at least one of catalytic water vapor reforming of a water vapor and fuel mixture, and partial oxidation of an oxygen and fuel combination;

a second catalytic reaction stage, operable for removing carbon monoxide from the product gas by selective CO oxidation, and operable for catalytic combustion of a mixture of fuel and oxygen; and feed and discharge pipes with valves that are operable during a normal operation phase to feed a mixture of fuel and at least one of water vapor and oxygen in a first direction, sequentially through said first catalytic reaction stage and thereafter through said second catalytic reaction stage, and operable during a starting phase to feed a mixture of fuel and oxygen in a second direction, sequentially through said second catalytic reaction stage and thereafter through said first catalytic reaction stage, said second direction being opposite to said first direction.

* * * * *